US006703102B1

(12) United States Patent
Prescott

(10) Patent No.: US 6,703,102 B1
(45) Date of Patent: Mar. 9, 2004

(54) DOOR JAMB PROTECTION DEVICE

(75) Inventor: Charles R. Prescott, 1134 Robert St., Pearland, TX (US) 77581

(73) Assignees: James B. Humphrey, Jr., Houston, TX (US); Jose Salvador Chavez, Houston, TX (US); Charles R. Prescott, Houston, TX (US)

( * ) Notice: Subject to any disclaimer, the term of this patent is extended or adjusted under 35 U.S.C. 154(b) by 0 days.

(21) Appl. No.: 10/212,406

(22) Filed: Aug. 6, 2002

(51) Int. Cl.[7] ........................................ B32B 3/18
(52) U.S. Cl. ........................................ 428/76; 428/99
(58) Field of Search ........................ 428/76, 99, 304.4; 52/211, 732.1, 732.3, 736.4

(56) References Cited

U.S. PATENT DOCUMENTS 4,443,508 A 4/1984 Mehl
4,555,870 A 12/1985 McKinnon et al.
D289,890 S 5/1987 Adell
4,768,320 A 9/1988 Weller
5,131,701 A 7/1992 Stepniewski
5,203,130 A 4/1993 Freelove
5,351,733 A 10/1994 Ullman
D373,717 S 9/1996 Ferverda
D376,213 S 12/1996 Macri
D381,087 S 7/1997 DiGiorgio
5,815,998 A 10/1998 Wamsher
D402,537 S 12/1998 Lorenzana

*Primary Examiner*—Alexander S. Thomas
(74) *Attorney, Agent, or Firm*—Harrison & Egbert

(57) ABSTRACT

A door jamb protection device including a section of foam material having a generally rectangular configuration and a plurality of self-coiling spring strips embedded in the section of foam material. The self-coiling spring strips extend transverse to a longitudinal axis of the foam material section. The spring strips are in parallel relationship to each other and have a concave side and a convex side. The spring strips have a property in which the spring strip holds a straightened shape when straightened and self-rolls when bent in a predetermined direction. The spring strips self-roll to encircle at least a portion of the door jamb.

20 Claims, 2 Drawing Sheets

DOOR JAMB PROTECTION DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to door jamb protection devices. Additionally, the present invention relates to self-coiling mats that can be applied to protect elongated objects during moving activities.

BACKGROUND OF THE INVENTION

When construction workers pass through doorways, the workers often carry equipment and materials which may scratch, chip, crack, or otherwise damage portions of the door jamb. The same problem can occur when movers are moving a person's belongings either into or out of an office or a residence. In this respect, it would be desirable if a device were provided that protected portions of a door jamb from damaging contact when the articles are moved through a doorway.

When an article passes through a doorway and bumps into a portion of the door jamb, the article itself may also become damaged in some way. In this respect, it would be desirable if a device were provided that protects articles that pass through a doorway from being damaged by contact with a door jamb.

Throughout the years, a number of innovations have been developed relating to protectors for portions of a door jamb. More specifically, U.S. Pat. No. 4,768,320 discloses a door frame guard that has a relatively stiff outer shell and a relatively soft inner lining. The relatively soft inner lining may well protect a door jamb from damage from articles moved through a doorway. However, the relatively stiff outer shell may damage articles that pass through the doorway and contact the door frame guard. In this respect, it would be desirable if a door jamb protector device were provided that has a relatively soft outer surface.

U.S. Pat. No. 5,203,130 discloses a door frame shield that includes four interfitting, relatively adjustable, stiff component parts. For purposes of simplicity of manufacture and use, it would be desirable if a door jamb protector device were provided which does not include a plurality of relatively adjustable, interfitting component parts.

In addition, the following U.S. patents may be of interest for their disclosure of protectors that protect the edges of movable planar sheet articles such as doors: U.S. Pat. Nos. 4,443,508, 4,555,870, 5,351,733, and U.S. Pat. Des. No. 289,890.

Still other features would be desirable in a door jamb protector device. For example, door jambs are not all the same thickness. In this respect, it would be desirable if a door jamb protector device were provided that is flexible and can be easily bent to be adapted to door jambs having different thicknesses. Furthermore, for purposes of simplicity and economy, it would be desirable if a door jamb protector were provided which is a single structural unit.

Thus, while the foregoing body of prior art indicates it to be well known to use door jamb protectors, the prior art described above does not teach or suggest a door jamb protector apparatus which has the following combination of desirable features: (1) protects portions of a door jamb from being damaged by contact by articles when the articles are moved through a doorway; (2) protects articles that pass through a doorway from being damaged by contact with a door jamb; (3) has a relatively soft outer surface; (4) does not include a plurality of relatively adjustable, intermitting component parts; (5) can be easily flexed to be adapted to door jambs having different thicknesses; and (6) is composed of a single structural unit.

Unfortunately, many movers are unwilling to utilize protective devices for door jambs. The main reason for this reluctance is the complicated nature in which such door jamb protection devices are configured. Since time is of the essence in moving activities, movers often lack the patience or available time in which to fixedly secure protective devices around door jambs. As such, it is important to make the protective device as simple to install as humanly possible. Additionally, and furthermore, any door jamb protection devices are curved in cross-section will be difficult to transport. Since cargo space is often limited in moving vehicles, movers will lack the space necessary to store a large number of such curved cross-section devices. As such, a need has developed for a door jamb protective device which can be stacked flat within the interior of the moving vehicle. Additionally, the door jamb protection devices should be able to be stacked so that they can be transported from the moving vehicle to the interior of the dwelling or office environment.

It is an object of the present invention to provide a door jamb protective device which effectively prevents damage to the door jamb during moving activities.

It is another object of the present invention to provide a door jamb protective device which is easy to install and easy to remove.

It is another object of the present invention to provide a door jamb protective device that can be stacked in a flat orientation following use.

It is a further object of the present invention to provide a door jamb protective device which can be transported in multiple numbers in a convenient arrangement.

It is still a further object of the present invention to provide a door jamb protective device which is easy to manufacture and relatively inexpensive.

These and other advantages of the present invention will become apparent from a reading of the attached specification and appended claims.

BRIEF SUMMARY OF THE INVENTION

The present invention is a door jamb protection device comprising a section of foam material having a generally rectangular configuration and a plurality of self-coiling spring strips embedded in the section of foam material. The plurality of self-coiling spring strips extend transverse to the longitudinal axis of the section of foam material. The plurality of self-coiling spring strips are in parallel relationship to each other. Each of the spring strips have a concave side and a convex side. Each of the spring strips has a property in which the spring strip holds a straightened shape when straightened and self-rolls in a predetermined direction.

Each of the spring strips has an identical configuration. The spring strips have ends that are in generally linear alignment with each other along the length of the section of foam material. The concave side of each of the spring strips faces a similar direction. The section of foam material is a foam rubber material.

When applied to the door jamb, each of the plurality of spring strips self-rolls to encircle at least a portion of the height dimension of the door jamb. Ideally, and preferably, the section of foam material will have a length extending for approximately an entire height dimension of the door jamb.

The present invention is also a method of preventing damage to a door jamb including the steps of: (1) forming a self-coiling mat by embedding a plurality of self-coiling spring strips within a section of foam material; (2) placing the self-coiling mat in proximity to the door jamb such that the convex side of the spring strips faces the door jamb; and (3) bending the self-coiling mat in a predetermined direction toward the door jamb until the self-coiling mat encircles at least a portion of the door jamb.

The self-coiling mat is positioned such that the longitudinal axis of the mat is in parallel relationship to the door jamb. The self-coiling mat can be removed from the door jamb by straightening the plurality of self-coiling spring strips until the self-coiling mat has a generally planar configuration. This self-coiling mat can then be stacked in a flat configuration.

DETAILED DESCRIPTION OF THE INVENTION

Figure 1:
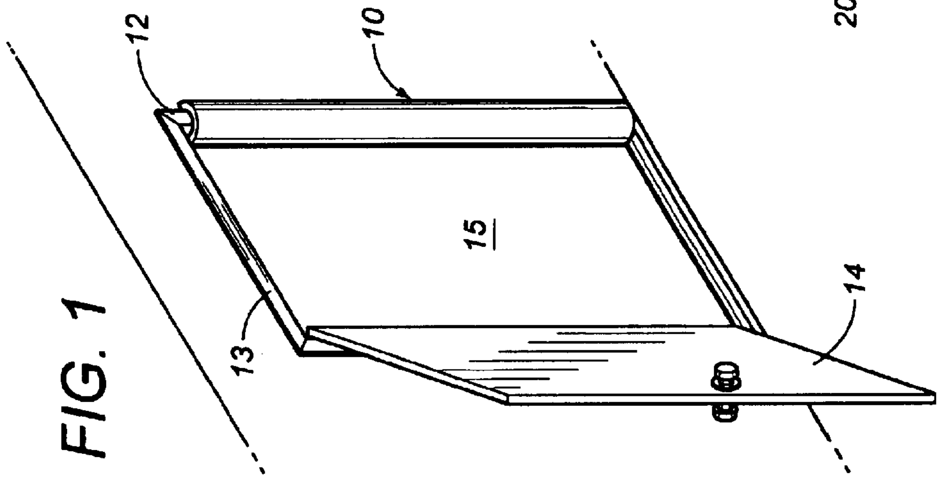
FIG. 1 is an illustration of the present invention as applied to a door jamb.

Referring to FIG. 1, there is shown the self-coiling mat 10 in accordance with the teachings of the present invention as applied to a door jam 12. The self-coiling mat 10 is curved so as to generally encircle the door jamb 12. The door jamb 12 is one side of the framework 13 into which the door 14 is hinged.

Conventionally, during moving activities, movers must move objects through the passageway 15 interior of the door frame 13. During the moving activities, it is often quite likely that the object being moved will contact the surface of the door jamb 12. By placing the self-coiling mat 10 around the door jamb 12, damage to the door jamb 12 is effectively reduced and/or prevented. The self-coiling mat 10 is illustrated in FIG. 1 as extending generally for the entire height dimension of the door jamb 12. However, within the concept of the present invention, the self-coiling mat 10 can extend for less than the entire height of the door jamb 12.

Figure 2:
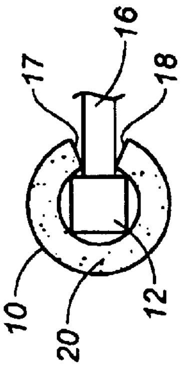
FIG. 2 is a top view showing the application of the self-coiling mat around the door jamb.

Referring to FIG. 2, it can be seen how the self-coiling mat 10 extends around the door jamb 12. Door jamb 12 is illustrated as connected to a wall 16. The self-coiling mat generally encircles the door jamb 12 and has outer edges 17 and 18 residing in proximity adjacent to opposite sides of the wall 16. The self-coiling mat 10 is made of a foam material 20 which effectively cushions any blows which may occur between the object being moved and the exterior surfaces of the door jamb 12. As will be described hereinafter, the mat can be easily removed from the door jamb 12 and placed in a planar configuration prior to and subsequent to use.

Figure 3:
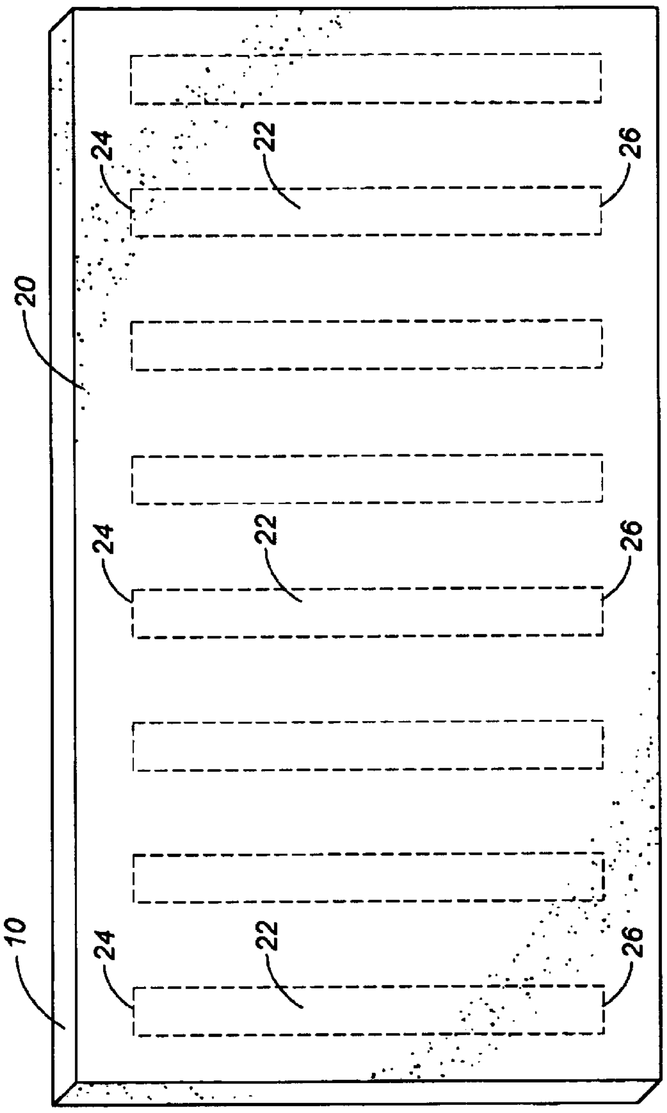
FIG. 3 is a plan view showing the self-coiling mat in a planar configuration.

Referring to FIG. 3, the door jamb protection device 10 includes a section of foam material 20 having a length dimension and a width dimension. A plurality of self-coiling spring strips 22 are embedded within the section of foam material 20 so as to extend generally transverse to the longitudinal axis of the section of foam material 20. Each of the self-coiling spring strips 22 is placed in generally parallel relationship to each other. The ends 24 of the strips are generally in linear alignment with each other along the length dimension of the section of foam material 20. Similarly, the ends 26 of each of the self-coiling spring strips 22 are in linear alignment with each other along the length dimension of the section of foam material 20. As shown in FIG. 3, a total of eight self-coiling spring strips are embedded within the section of foam material. More or fewer of the strips 22 can be formed within the foam material 20 depending upon the length of the elongated object upon which the protective device 10 is applied.

The section of foam material 20 has a generally rectangular configuration. Specifically, in the preferred embodiment of the present invention, the foam material 20 is foam rubber. The self-coiling mat 10 should have a suitable length so as to extend for the height dimension of the door jamb and a suitable width so as to extend substantially around the door jamb.

Each of the self-coiling spring strips 22 operate so as to self-roll the section of foam material 20 around the exterior surface of the door jamb. Each of the self-coiling spring strips 22 has a concave side and a convex side. These spring strips 22 have a property that, when straightened, the spring strip holds a straightened shape and, when bent in a predetermined direction, the spring strip self-rolls so as to encircle the door jamb or other elongated object. The spring strips 22 extend transverse across the section of foam material 20. Each of the spring strips 22 has a concave side facing the same direction. All of the spring strips 22 have a similar configuration.

Figure 4:
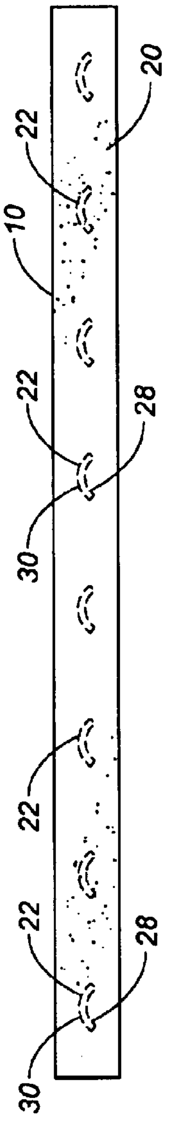
FIG. 4 is a side view of the self-coiling mat of the present invention.

FIG. 4 shows a side view of the section of foam material 20 of the self-coiling mat 10. As can be seen, each of the self-coiling strips 22 has a concave side 28 and a convex side 30. Each of the concave sides 28 faces the same direction. Similarly, each of the convex sides 30 faces the same direction. Each of the spring strips 22 is illustrated as embedded in generally a similar location through the thickness of the section of foam material 10. In the illustration of the self-coiling mat shown in FIGS. 3 and 4, the spring strips 22 maintain the mat 10 in a generally flat planar configuration. As a result, the mat can be placed in a flat stacked orientation during transportation and storage. The light weight of the foam material 20, along with the spring strips 22, allow any worker to easily move the self-coiling mat 10 to a desired location with minimal effort. The mat 10 can simply be placed into proximity with the door jamb 12, bent, and self-roll around the door jamb 12. Subsequent to use, the worker can simply pull the outer edges 17 and 18 away from the door jamb 12, straighten the self-coiling spring strips 22 and place the planar self-coiling mat 10 upon a flat surface.

Figure 5:
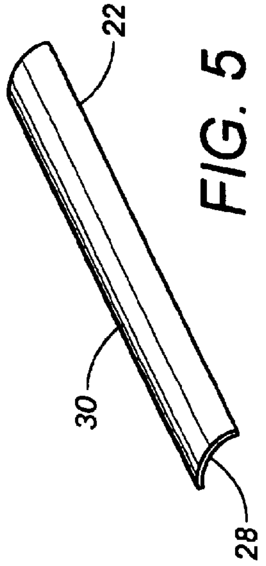
FIG. 5 is an isolated perspective view of a single self-coiling spring strip in a straightened configuration.
Figure 6:
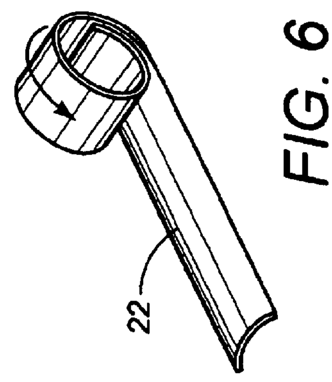
FIG. 6 is a perspective view of the self-coiling spring strip rolling following bending.

FIG. 5 shows an isolated view of the spring strip 22. As can be seen, the spring strips 22 have a concave side 28 and a convex side 30. When straightened, as shown in FIG. 5, the concave/convex surfaces tend to keep the strip 22 straight. However, once a bending of the strip is initiated, it self-rolls itself, as illustrated in FIG. 6. The arrow in FIG. 6 illustrates the rolling direction of one end of the self-rolling spring strip 22 toward the other end. The roll-up power of the spring strip 22 will vary in accordance with the width of the strip and its thickness. It is therefore easy to provide the spring strip 22 with different roll-up forces with different requirements for use. During storage, the spring strip 22 should be in the position illustrated in FIG. 5 so that the section of foam material 20 remains flat. During actual use, the spring strips 22 should be slightly bent so as to cause the roll up, as shown in FIG. 6.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A door jamb protection device comprising:

a section of foam material having a generally rectangular configuration, said section of foam material having a longitudinal axis; and a plurality of self-coiling spring strips embedded in said section of foam material, said plurality of said self-coiling spring strips extending transverse to said longitudinal axis of said section of foam material, said plurality of self-coiling spring strips being in parallel relationship to each other, each of said plurality of self-coiling spring strips having a concave side and a convex side and a property in which the spring strip holds a straighten shape when straightened and self-rolls when bent in a predetermined direction.

2. The device of claim 1, each of said plurality of self-coiling spring strips having an identical configuration.

3. The device of claim 1, each of said plurality of self-coiling spring strips having ends in generally linear alignment with each other along the length of said section of foam material.

4. The door jamb protection device of claim 1, said concave side of each of said plurality of self-coiling spring strips facing a similar direction.

5. The device of claim 1, said section of foam material being a foam rubber material.

6. The device of claim 1, further comprising:

a door jamb having a height dimension, each of said plurality of self-coiling spring strips self-rolling to encircle said door jamb along at least a portion of said height dimension of said door jamb.

7. The device of claim 6, said section of foam material having a length extending for an entire length dimension of said door jamb.

8. A self-coiling apparatus for protection of an elongated object comprising:

a section of foam material having a generally rectangular configuration, said section of foam material having a longitudinal axis; and a plurality of self-coiling spring strips embedded in said section of foam material, said plurality of self-coiling spring strips extending transverse to said longitudinal axis to said section of foam material, said plurality of self-coiling spring strips being in parallel relationship to each other, each of said plurality of self-coiling spring strips having a concave side and a convex side and a property in which the spring strip holds a straightened shape when straightened and self-rolls when bent in a predetermined direction so as to at least partially encircle the elongated object.

9. The apparatus of claim 8, each of said plurality of self-coiling spring strips having an identical configuration.

10. The device of claim 8, each of said plurality of self-coiling spring strips having ends in generally linear alignment with each other along the length of said section of foam material.

11. The apparatus of claim 8, said concave side of each of said plurality of self-coiling spring strips facing a similar direction.

12. The apparatus of claim 8, said section of foam material being a foam rubber material.

13. The apparatus of claim 8, the elongated object being a door jamb.

14. A method of preventing damage to an elongated object comprising:

forming a self-coiling mat having a plurality of self-coiling spring strips embedded in a section of foam material, said plurality of self-coiling spring strips extending transverse to a longitudinal axis of said section of foam material, said plurality of self-coiling spring strips being in parallel relationship to each other and having a concave side and a convex side;

placing said self-coiling mat in proximity to the elongated object such that said convex side faces the elongated object; and bending the self-coiling mat in a predetermined direction toward the elongated object until said self-coiling mat encircles at least a portion of the elongated object.

15. The method of claim 14, said step of placing comprising:

positioning said self-coiling mat such that said longitudinal axis is in parallel relationship to the elongated object.

16. The method of claim 14, further comprising:

removing said self-coiling mat from the elongated object by straightening said plurality of self-coiling spring strips until said self-coiling mat has a generally planar configuration.

17. The method of claim 16, further comprising:

stacking said self-coiling mat upon a flat surface.

18. The method of claim 14, the elongated object being a door jamb, said self-coiling mat extending for at least a portion of a length of said door jamb.

19. The method of claim 14, each of said plurality of self-coiling spring strips having an identical configuration, each of said plurality of self-coiling spring strips having ends in generally linear alignment with each other along a length of said section of foam material.

20. The method of claim 14, said section of foam material being a foam rubber material interposed between said self-coiling spring strips and an external surface of the elongated object.

* * * * *